(12) United States Patent
Gatton

(10) Patent No.: US 7,204,493 B1
(45) Date of Patent: Apr. 17, 2007

(54) LATHE CHUCK WITH STEPPED JAWS

(75) Inventor: Geoffrey L. Gatton, Farmington, MI (US)

(73) Assignee: Hayes Lemmerz International, Inc., Northville, MI (US)

( * ) Notice: Subject to any disclaimer, the term of this patent is extended or adjusted under 35 U.S.C. 154(b) by 96 days.

(21) Appl. No.: 10/859,651

(22) Filed: Jun. 3, 2004

(51) Int. Cl.
*B23B 31/12* (2006.01)

(52) U.S. Cl. .................. 279/106; 279/123; 279/141; 279/152; 157/16

(58) Field of Classification Search .......... 279/106, 279/119, 123, 141, 152, 153; 157/14, 16, 157/18
See application file for complete search history.

(56) References Cited

U.S. PATENT DOCUMENTS

| | | | | |
|---|---|---|---|---|
| 1,321,739 A | * | 11/1919 | Haltman | 279/118 |
| 2,018,088 A | * | 10/1935 | Poock et al. | 279/136 |
| 2,488,822 A | * | 11/1949 | McDonald | 279/123 |
| 2,722,427 A | * | 11/1955 | Labeyrie | 279/119 |
| 2,865,643 A | * | 12/1958 | Parker et al. | 279/106 |
| 3,767,219 A | * | 10/1973 | Fischer et al. | 279/106 |
| 4,034,786 A | | 7/1977 | Feldmann et al. | |
| 4,838,561 A | * | 6/1989 | Baranzelli et al. | 279/127 |
| 5,464,233 A | * | 11/1995 | Hanai | 279/137 |
| 5,503,508 A | * | 4/1996 | Amiguet et al. | 408/1 R |
| 5,562,007 A | | 10/1996 | Seymour | |
| 5,820,137 A | * | 10/1998 | Patterson | 279/141 |
| 5,848,795 A | * | 12/1998 | Masatsugu et al. | 279/137 |
| 5,895,059 A | * | 4/1999 | Patterson | 279/106 |
| 6,039,104 A | * | 3/2000 | Cunningham et al. | 157/21 |
| 6,126,174 A | | 10/2000 | Reece et al. | |
| 6,371,493 B1 | * | 4/2002 | Barbieux | 279/106 |
| 6,394,467 B1 | * | 5/2002 | Oki et al. | 279/106 |
| 6,478,311 B1 | * | 11/2002 | Hinson | 279/123 |
| 6,481,281 B1 | | 11/2002 | Gerdes | |
| 6,502,834 B1 | | 1/2003 | Fukui et al. | |
| 6,918,599 B2 | * | 7/2005 | Patterson et al. | 279/106 |

FOREIGN PATENT DOCUMENTS

JP 09066406 A * 3/1997
JP 2004122320 A * 4/2004

* cited by examiner

*Primary Examiner*—Monica Carter
*Assistant Examiner*—Michael W. Talbot
(74) *Attorney, Agent, or Firm*—MacMillan, Sobanski & Todd, LLC

(57) ABSTRACT

A chuck for mounting wheel castings having different diameters upon a wheel lathe for machining the casting to final shape is provided. The chuck includes stepped jaw inserts that cooperate with corresponding stepped part supports to securely mount the wheel castings upon the chuck.

9 Claims, 3 Drawing Sheets

LATHE CHUCK WITH STEPPED JAWS

CROSS-REFERENCE TO RELATED APPLICATIONS

Not Applicable

STATEMENT REGARDING FEDERALLY SPONSORED RESEARCH OR DEVELOPMENT

Not Applicable

REFERENCE TO A SEQUENCE LISTING, A TABLE, OR A COMPUTER PROGRAM LISTING COMPACT DISC APPENDIX

Not Applicable

BACKGROUND OF THE INVENTION

This invention relates in general to fixtures for mounting vehicle wheel castings on machine tools during finishing operations and in particular to a universal chuck for mounting wheel castings having different diameters upon a wheel lathe for machining a final shape.

Light weight alloy vehicle wheels are becoming increasingly popular. Such wheels typically include an annular wheel rim which carries a pneumatic tire. A circular wheel disc is formed across one end of the wheel rim. The wheel disc usually includes a central hub portion supported within the wheel rim by a plurality of wheel spokes. A central pilot hole and plurality of wheel mounting holes are formed through the wheel hub.

One conventional process for manufacturing light weight alloy wheels involves pouring molten metal into a wheel mold to form a casting of the wheel. After the molten metal solidifies, the wheel casting is removed from the mold. The wheel casting is oversized and is machined to final shape. Alternately, a full face wheel disc which includes the outboard tire bead retaining flange is cast from a light weight alloy and machined to final shape. A partial wheel rim, which can be rolled from a strip of steel, is then welded to an inboard surface of the wheel disc to form a two piece wheel. Such a wheel combines the low cost and strength of a steel rim with a pleasing aesthetic appearance of a wheel disc cast from a light weight metal and is usually referred to as a bimetal wheel.

Machining the wheel or wheel disc casting typically includes multiple operations. Sawing machines cut any casting gates and risers from the wheel casting. A drilling machine is used to drill the wheel mounting holes through the wheel hub. The wheel casting is then mounted upon a wheel lathe for machining to its final shape. During the lathe operations, the inside surface of the wheel hub is usually faced to provide a flat mounting surface. Similarly, the outboard wheel hub surface is faced and both the inside and outside of the wheel rim are turned to their final shapes. The central pilot hole is usually drilled while the casting is clamped in the lathe for turning the inboard tire bead seat.

Referring now to the drawings, there is shown generally at 10 in FIG. 1 a sectional view of a prior art chuck for clamping a wheel casting on a wheel lathe (not shown). The chuck 10 includes a cylindrical riser adapter 11 which is attached to the rotatable spindle of a wheel lathe (not shown) by conventional means. The riser adapter 11 supports a circular face plate 12. The face plate 12 has a center opening 13 formed therethrough which receives a generally cylindrical center assembly 14. The center assembly 14 carries a plurality of locator pylons 15 (one shown) which position a wheel casting 16 upon the chuck 10. The face plate 12 also carries a plurality of part rests 17 (one shown) which are attached about the circumference thereof. A plurality of slots 18 (one shown) are formed in the outer edge of the face plate 12 and extend inward in a radial direction.

An actuator rod 20 extends axially into the riser adapter 11. A circular yoke plate 21 is disposed within the riser adapter 11 and attached to the end of the actuator rod 20. A plurality of guide pins 22 (one shown) extend between the riser adapter 11 and the face plate 12 and pass through apertures formed in the yoke plate 21. The actuator rod 20 and yoke plate 21 are movable in an axial direction by a conventional mechanism (not shown). A plurality of external arms 23 (one shown) are pivotally mounted upon tabs which extend radially from the circumference of the yoke plate 21. A generally L-shaped arm guide slot 24 extends through each arm 23. A first end of each arm 23 is received by an associated face plate arm slot 18. An arm guide pin 25 extends transversely through the arm guide slot 24. A jaw insert 26 is secured to a second end of each of the arms 23.

During the machining operations, the actuator rod 20 and yoke plate 21 are moved to the right in FIG. 1. As the yoke plate 21 moves, the arm guide slots 24 cooperate with the arm guide pins 25 to urge the arms 23 and jaw inserts 26 in an outward radial direction, thereby opening the chuck 10. The wheel casting 16 is then placed on the locator pylons 15 and the actuator rod 20 and yoke plate 21 are moved to the left in FIG. 1. As the yoke plate 21 moves, the arm guide slots 24 cooperate with the arm guide pins 25 to urge the arms 23 and jaw inserts 26 in an inward radial direction, closing the chuck 10 upon the wheel casting 16. The jaw inserts 26 cooperate with the part rests 17 to clamp the wheel casting 16 in the chuck 10.

As illustrated in FIG. 1, the conventional wheel lathe chuck 10 clamps the ends of a wheel casting 16 to a wheel lathe. The jaw inserts 26 and part rests 17 provide opposing surfaces that clamp the end portions of the wheel casting 16 to the chuck. However, the opposing surfaces of the jaw inserts 26 and part rests 17 provide a single clamping configuration for the chuck 10. In manufacturing operations, it is desirable to have the capacity to machine wheel castings of varying diameters. For example, a wheel manufacturing facility may desire to machine wheel castings for 16, 19, and 20-inch wheels to satisfy demand from customers. Currently, using conventional chucks, a manufacturing facility must have multiple chucks on hand to accommodate castings for the various diameters. Alternatively, a single chuck can be used, and the jaw inserts and part rests can be adjusted and/or changed with other inserts and rests of different size to accommodate differently sized castings. Each of these current approaches clearly has drawbacks in that additional chucks or chuck components must be kept in inventory and time is required to either change out or reconfigure the chuck for different diameter wheel castings. The need to stock the parts and time required to make changes increase the manufacturing costs of the wheels. Accordingly, it would be desirable to provide a chuck that accommodates wheel castings of varying sizes.

BRIEF SUMMARY OF THE INVENTION

This invention relates to an improved chuck for mounting wheel castings having different diameters upon a wheel lathe for machining the casting to final shape.

The present invention contemplates an apparatus adapted to releasably clamp an end of a wheel component to a lathe spindle that includes a support structure adapted to be secured to the lathe spindle with a plurality of fixed stepped part rests attached to the support structure. Each of the part rests has a plurality of steps formed therein with each step adapted to contact a first portion of the vehicle wheel component having a diameter corresponding to the step. The apparatus also includes a plurality of stepped arms movably mounted upon the support structure with each of the arms having a plurality of steps therein that correspond to the part rest steps and with each arm step adapted to contact a second portion of the vehicle wheel component having a diameter corresponding to the step. The corresponding arm and part rest steps co-operate to clamp the vehicle wheel component to retain the wheel component upon the apparatus, whereby the arm and part rest steps are operative to clamp and retain a plurality of wheel components having different diameters upon the apparatus.

The present invention also contemplates that the part rest steps have radial dimensions that decrease as the axial distance from the supporting structure increases while the arms have radial dimensions that increases as the axial distance from the supporting structure increases. Additionally, the part rest and arm steps are shaped to correspond to the shape of an end of the wheel component and generally are mirror images of one another.

Various objects and advantages of this invention will become apparent to those skilled in the art from the following detailed description of the preferred embodiment, when read in light of the accompanying drawings.

DETAILED DESCRIPTION OF THE PREFERRED EMBODIMENT

Figure 2:
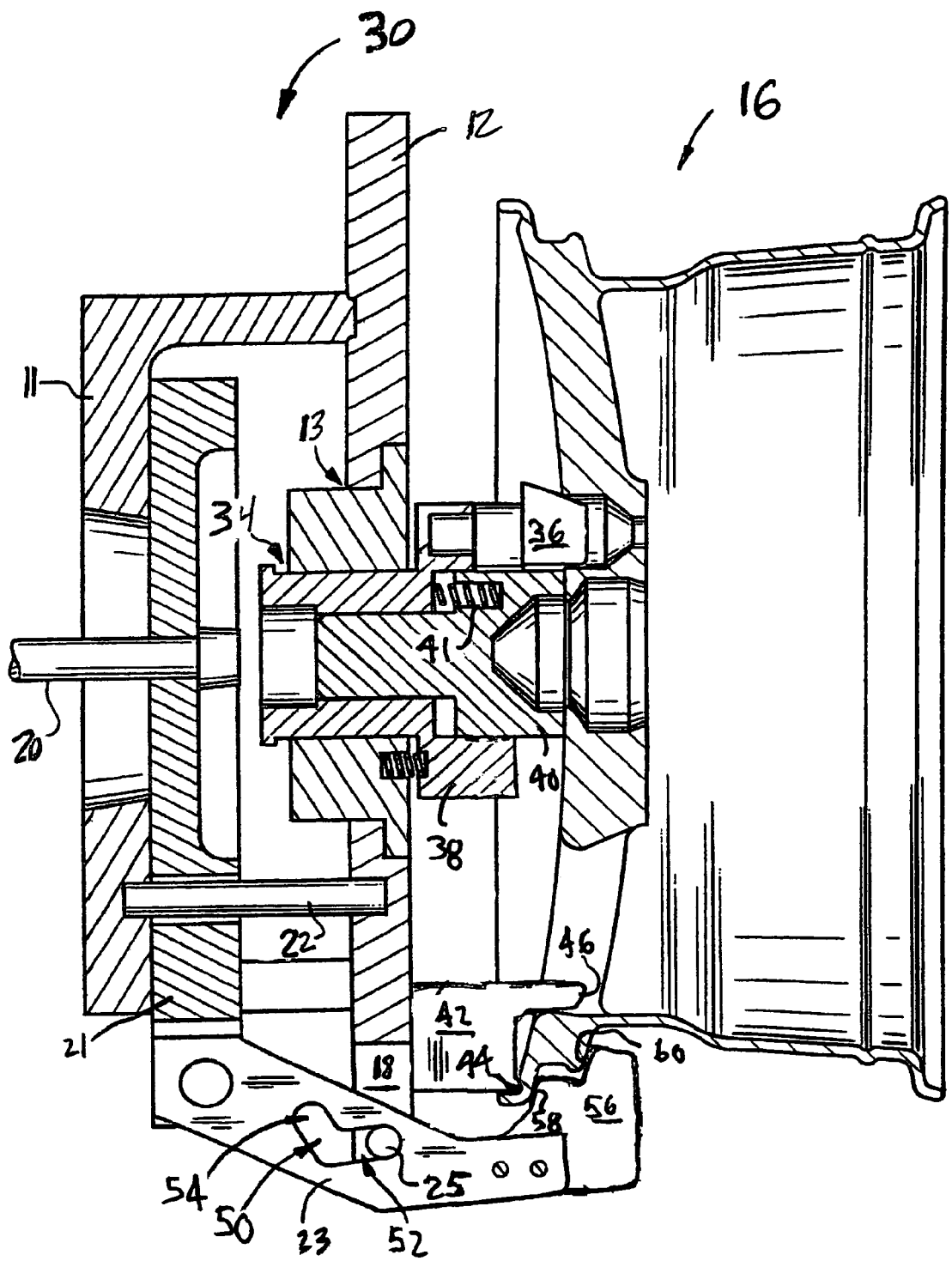
FIG. 2 is a sectional view of a wheel lathe chuck according to an embodiment of the invention clamping a wheel casting of a first diameter.
Figure 3:
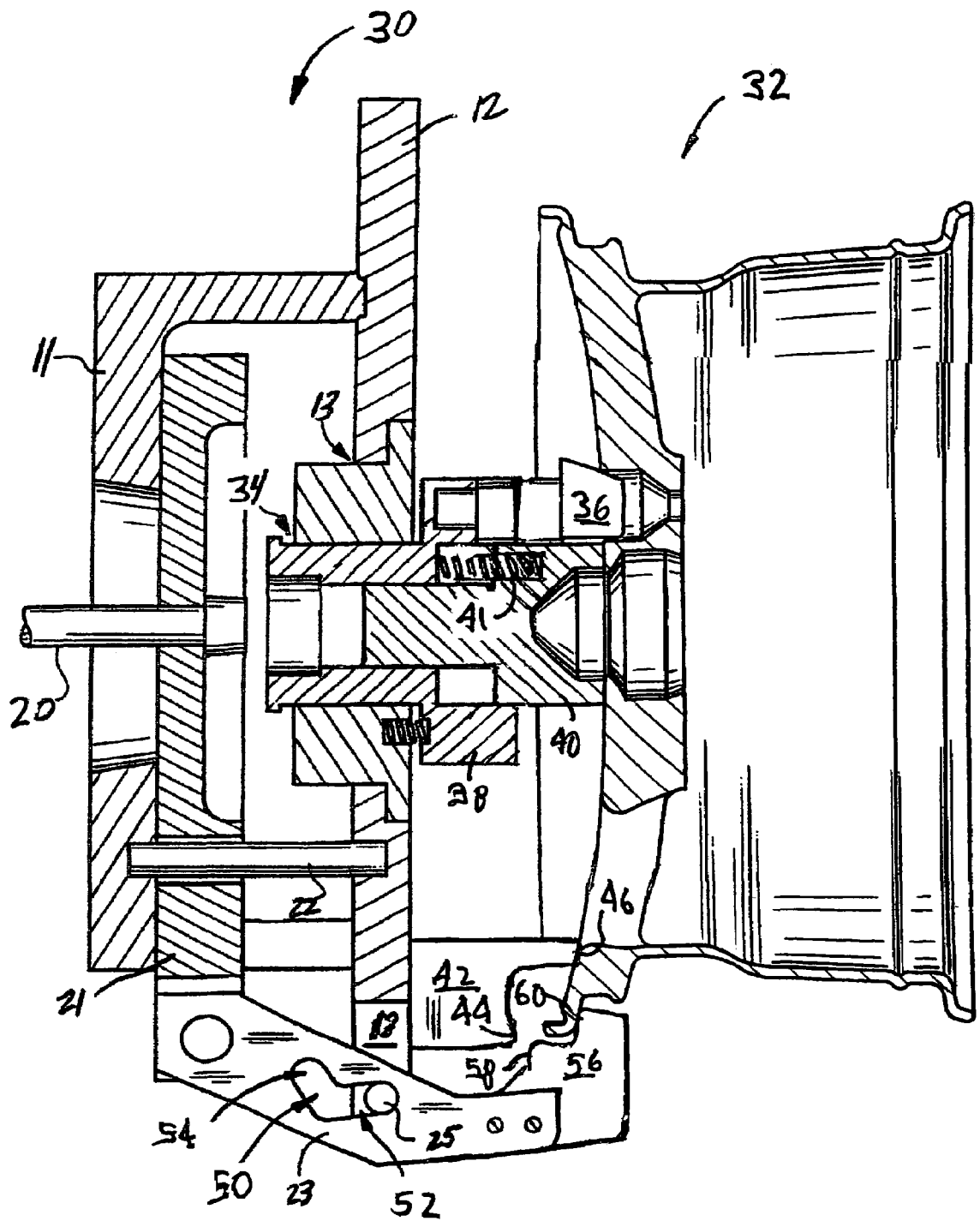
FIG. 3 is a sectional view of the wheel lathe chuck illustrated in FIG. 2 clamping a wheel casting of a second, different diameter.

Referring again to the drawings, there is shown in FIGS. 2 and 3 sectional views of an improved chuck 30 for mounting a vehicle wheel casting upon a wheel lathe (not shown) in accordance with the invention. In the interest of simplicity, not all of the fasteners which secure components of the chuck 30 to one another are shown in FIGS. 2 and 3. The chuck 30 can clamp vehicle wheel castings of varying diameters. In FIG. 2, a one-piece wheel casting 16 of a first diameter is mounted upon the chuck 30. FIG. 3 illustrates a second one-piece wheel casting 32 having a second different diameter, that is less than the first diameter of the wheel 16 shown in FIG. 2, mounted upon the chuck 110.

The improved chuck 30 is similar to the prior art chuck 10 illustrated in FIG. 1 and described above, except as described below. Accordingly, similar reference numbers in FIGS. 2 and 3 refer to similar features and/or elements shown in FIG. 1.

As described above, the chuck 30 includes a cylindrical riser adapter 11 attached to the rotatable spindle of a wheel lathe (not illustrated in FIGS. 2 and 3). The riser adapter 11 supports a circular face plate 12 having a central opening 13 that receives a center assembly 34. The center assembly 34 carries a plurality of locator telescoping pylons 36 that can extend in an axial direction to position the wheel casting 16 upon the chuck 30. In the preferred embodiment, a spring (not shown) is disposed within each of the pylons 36 to urge the end of the pylon 36 toward the wheel casting; however, the invention also may be practiced utilizing other methods of extension for the pylons 36. Similarly, the base 38 of the center assembly 34 extends further to the right than the similar component shown in FIG. 1. The base extension allows further axial travel of a center support 40 that supports the hub of the wheel casting 16. In the preferred embodiment, a plurality of springs 41 (one shown) are disposed between the base 38 and the center support 40. The springs 41 are operative to urge the center support axially toward the right of FIGS. 2 and 3. The reasons for the axial extension of the pylons 36 and the center support 40 will become apparent when the description below is read. A plurality of slots 18 are formed in the outer edge of the face plate 12 and extend inward in a radial direction.

A plurality of stationary part rests 42 (one shown) are attached about the circumference of the face plate 12. Each of the part rests 42 is stepped with the steps reducing the radial dimension of the part rest 42 as the axial distance from the face plate 12 increases. As shown in FIGS. 2 and 3, the steps defining first 44 and second 46 clamping surfaces. While two steps defining two clamping surfaces 44 and 46 are shown in FIGS. 2 and 3, it will be appreciated that the invention also may be practiced with part rests having more than two steps (not shown) defining additional clamping surfaces. The part rest steps are shaped to correspond to the shape of the ends of wheel rim castings. Thus, the shapes shown are to be considered exemplary and the invention also may be practiced with part rests having shapes different from those shown as required by a specific series of vehicle wheels.

An actuator rod 20 extends axially into the riser adapter 11. A circular yoke plate 21 is disposed within the riser adapter 11 and attached to the end of the actuator rod 20. A plurality of guide pins 22 extend between the riser adapter 11 and the face plate 12 and through apertures formed on the yoke plate 21. The actuator rod 20 and yoke plate 21 are moveable in an axial direction. A plurality of movable external arms 23 are pivotally mounted upon tabs which extend from the circumference of the yoke plate 21. An arm guide slot 50 extends through each arm 23 and includes first 52 and second 54 guide slot portions. While the guide slot 50 appears to have a similar shape to the guide slot 24 shown in FIG. 1, the actual shape of the slot 50 is determined by required movement of the arms. Thus, the shape of the guide slot 50 shown in FIGS. 2 and 3 is meant to be exemplary and the invention also may be practiced with guide slots having shapes different from those shown. A first end of each arm 23 is received by one of the slots 18 in the face plate 12. An arm guide pin 25 extends transversely through the arm guide slot 50.

A stepped jaw insert 56 is secured to a second end of each arm 50. The jaw inserts 56 cooperate with an associated part rest 42 to clamp a wheel casting upon the chuck 30. Each jaw insert 56 stepped in a generally mirror image to correspond to the associated part rest step 42. Thus, each of the jaw inserts 56 is stepped with the steps increasing the radial dimension of the jaw insert 56 as the axial distance from the face plate 12 increases. Similar to the part rest steps, the jaw insert steps are shaped to correspond to the shape of the ends of wheel rim castings. Thus, the shapes shown are to be considered exemplary and the invention also may be practiced with jaw inserts having shapes different from those shown as required by a specific series of vehicle wheels. The jaw insert steps define first 58 and second 60 clamping surfaces. While two steps defining two clamping surfaces 58 and 60 are shown in FIGS. 2 and 3, it will be appreciated that the invention also may be practiced with jaw inserts having more than two steps (not shown) defining additional clamping surfaces. Additionally, as will become apparent below, the part rests 42 and jaw inserts 56 are also shaped as necessary to avoid any interference with different sized wheel castings.

The jaw insert steps co-operate with the part rest steps to define clamping regions. Thus, a first clamping region 62 is defined between the first clamping surfaces of each pair of jaw insert and the part rests 58 and 44, respectively. Similarly, a second clamping region is defined between second clamping surfaces of each pair of jaw insert and the part rests 60 and 46, respectively. Each clamping region can receive a portion of the end of a wheel casting, and the appropriate jaw insert clamping surfaces 58 and 60 and corresponding part rest surfaces 44 and 46 clamp the portion of the wheel casting, thereby securely mounting the wheel casting upon the chuck 110.

The stepped shape of the jaw inserts 56 and the part rests 42, allows the second clamping region to receive the wheel 32 shown in FIG. 3 that has a smaller diameter than the wheel 16 shown in FIG. 2. In FIG. 2, the first clamping region is used to mount the wheel casting 16 upon the chuck 30 while, in FIG. 3, the second clamping region is used to mount the wheel casting 32 upon the chuck 30. It will be noted that the stepped arrangement of the jaw inserts 56 and part rests 42 results in the smaller diameter wheel 32 being offset axially to the right in FIG. 3 from the position shown for the wheel 16 in FIG. 2. However, as described above, the telescoping pylons 36 and the center support 40 are urged axially to the right by their internal springs to absorb the axial offset that results when a smaller diameter wheel is mounted clamped by the stepped jaw inserts 56 and part rests 42.

Figure 1:
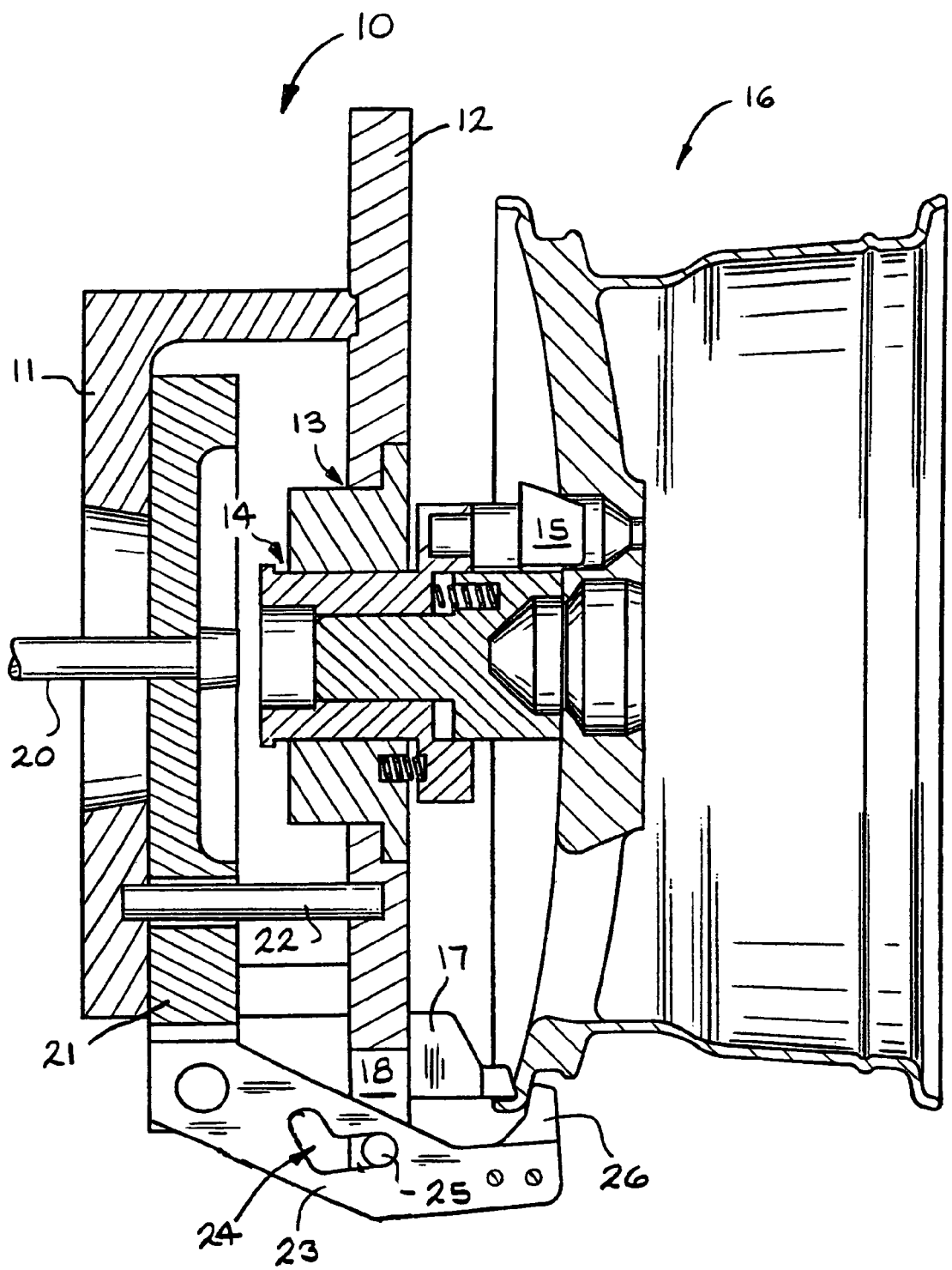
FIG. 1 is a sectional view of a wheel lathe chuck in accordance with the prior art.

The operation of the chuck 30 is similar to the operation of the prior art chuck 10 illustrated in FIG. 1. Importantly, as described above, the wheel chuck 30 receives wheel castings of varying diameter. Thus, in operation, movement of the actuator rod 20 and yoke plate 21 to the right in FIG. 2 causes the arms 23 to pivot outward, opening the chuck 30. A first wheel casting 16 is then positioned upon the locators 36. The actuator rod 20 and yoke plate 21 are then moved to the left in FIG. 2. This causes the arms 23 to pivot inward due to movement of arm guide pin 25 in arm guide slot 50. The inward movement of the arms 23 closes the chuck 30 and causes the jaw inserts 56 and part rests 42 to clamp the wheel casting between the first clamping surfaces 58 and 44 in the first clamping region. Similar operation of the wheel chuck allows clamping a second wheel casting 32, having a smaller diameter, between the second clamping surfaces 60 and 46 in the second clamping region 64, as illustrated in FIG. 3.

The improved chuck 30 can be used for machining operations for a plurality of vehicle wheel castings of varying diameters. For example, a first vehicle wheel casting having a first diameter can be mounted on the chuck and machined. Then, the first vehicle wheel casting can be removed from the chuck and a second vehicle wheel casting having a second, different diameter can be mounted on the chuck and machined without the need to replace of restructure the wheel chuck. Thus, the invention permits efficient machining of vehicle wheel castings of varying diameters while eliminating time required to change or reconfigure the chuck. The time savings and elimination of part inventory combine to reduce the cost of wheel manufacturing.

While the preferred embodiment of the invention has been illustrated and described for machining one piece wheel casting, it will be appreciated that the invention also may be practiced for machining wheel components. Thus, the invention also may be utilized to machine full face wheel discs having different diameters.

In accordance with the provisions of the patent statutes, the principle and mode of operation of this invention have been explained and illustrated in an exemplary embodiment. However, it must be understood that this invention may be practiced otherwise than as specifically explained and illustrated without departing from its spirit or scope. For example, the part rests and jaw inserts could be formed with three steps or more to allow clamping of wheels having three or more different diameters.

In accordance with the provisions of the patent statutes, the principle and mode of operation of this invention have been explained and illustrated in its preferred embodiment. However, it must be understood that this invention may be practiced otherwise than as specifically explained and illustrated without departing from its spirit or scope.

What is claimed is:

1. An apparatus adapted to releasably clamp an end of a wheel component upon a lathe spindle, the apparatus comprising:
   a support structure adapted to be secured to the lathe spindle;
   a plurality of fixed part rests attached to said support structure, each of said part rests having a plurality of steps formed therein with each step adapted to contact a first portion of the vehicle wheel component having a diameter corresponding to said step, said steps progressing radially inward with increasing axial distances from said support structure; and
   a plurality of stepped arms movably mounted upon said support structure, each of said arms having a plurality of steps formed therein that correspond to said part rest steps with each arm step adapted to contact a second portion of the vehicle wheel component having a diameter corresponding to said step, said corresponding arm and part rest steps co-operating to clamp the vehicle wheel component to retain the wheel component upon said apparatus, whereby said arm and part rest steps are operative to clamp and retain a plurality of wheel components having an axis of rotation and different diameters upon the apparatus for rotation of the wheel component about the wheel component axis of rotation.

2. The apparatus of claim 1 wherein said part rest and arm steps are shaped to correspond to a shape of an end of the wheel component.

3. The apparatus of claim 2 wherein said part rest steps have radial thicknesses that decrease as the axial distance from said supporting structure increases.

4. The apparatus of claim 3 wherein said arm steps have radial thicknesses that increase as the axial distance from said supporting structure increases.

5. The apparatus of claim 4 wherein said stepped arms are shaped in a general mirror image of said stepped part rests.

6. The apparatus of claim 5, wherein the second end of each of said plurality of arms comprises a removable jaw insert, said jaw insert including said steps.

7. The apparatus of claim 6 further including a plurality of telescoping locating pins mounted upon said support structure, said telescoping locating pins operable to position the wheel component upon the apparatus prior to clamping.

8. The apparatus of claim 7 wherein said wheel component is a one piece cast wheel.

9. The apparatus of claim 8 wherein said wheel component is a full face wheel disc.

* * * * *